Jan. 4, 1949.　　　　C. R. AHRENS　　　　2,458,127
CONVERTIBLE VEHICLE
Filed Feb. 25, 1947

INVENTOR.
Charles R. Ahrens
BY
Christian R. Nielsen
ATTORNEY

Patented Jan. 4, 1949

2,458,127

UNITED STATES PATENT OFFICE 2,458,127

CONVERTIBLE VEHICLE

Charles R. Ahrens, Glendale, Calif.

Application February 25, 1947, Serial No. 730,696

3 Claims. (Cl. 280—7.10)

An object of the invention is the provision of a manually propelled vehicle which may be converted readily from a bicycle to a tricycle or vice versa, in a practical manner, the vehicle having a saddle-supporting frame terminating in a yoke at the rear end, the legs of said yoke being tubular to receive posts projecting from legs which have bores, an axle carrying at least one wheel being mounted in said bores with a pin inserted through alined passages in the posts and associated legs of the yoke.

Another object of the invention is the provision of a manually propelled vehicle which may be converted readily from a bicycle to a tricycle and vice versa in a practical manner, said vehicle including a saddle supporting frame provided with a fork at the rear end, the legs of the fork being tubular for receiving posts projecting from lugs square-shaped in cross section, an axle being mounted in bores in the lugs with means connected to the axle for retaining the lugs properly spaced, the posts being pinned to the legs, at least one wheel being mounted on the axle.

A further object of the invention is the provision of a manually propelled vehicle which may be converted readily from a bicycle to a tricycle and vice versa by removing at least two pins so that a one-wheeled unit may be withdrawn and a two-wheeled unit substituted therefor with the return of the pins for securing the last-mentioned unit in position.

The invention consists in the novel construction, arrangement and combination of parts hereinafter more particularly described and claimed.

Referring more particularly to Figures 1, 3 and 4, 10 designates generally a tricycle having a front wheel, 11, which is propelled manually and which supports a fork 12 at the front end of a frame 13 carrying a saddle 14. The rear end of the frame is in the form of a yoke composed of tubular legs 15.

Figures 3, 4:
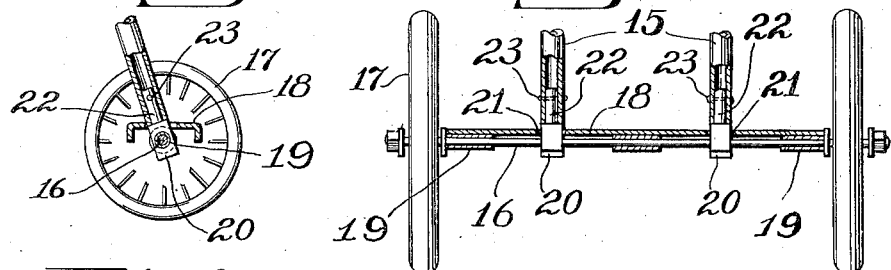
Figure 3 is a fragmentary transverse vertical section through the two-wheeled unit shown in Figure 1.
Figure 4 is a longitudinal vertical section taken along the axle in the two-wheeled rear unit of Figure 1.
Figure 5:
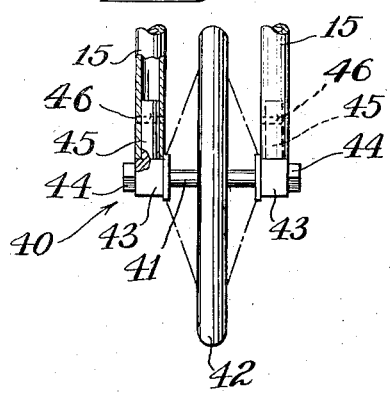
Figure 5 is a fragmentary rear view in elevation of the one-wheeled rear unit shown in Figure 2.

An axle 16 is carried by wheels 17 rotatably mounted thereon. A plate 18 forming a tread is welded to the axle between the wheels. Sleeves 19 forming bearings for the axle are also welded to the plate in spaced relation. The opposite longitudinal edges of said plate are curved downwardly as shown in Figure 3.

Spaced lugs 20 have bores which receive the axle 16. These lugs are square shaped in cross section and are received by square shaped openings 21 formed in the plate 18.

A post 22 projects upwardly from each lug and is received by the extreme lower ends of the hollow tubular legs 15. A pin 23 is forced through alined transverse passages in each leg and the housed post 22 for securing the legs not only to the lugs but to the two-wheeled rear unit 30.

Figures 1, 2:
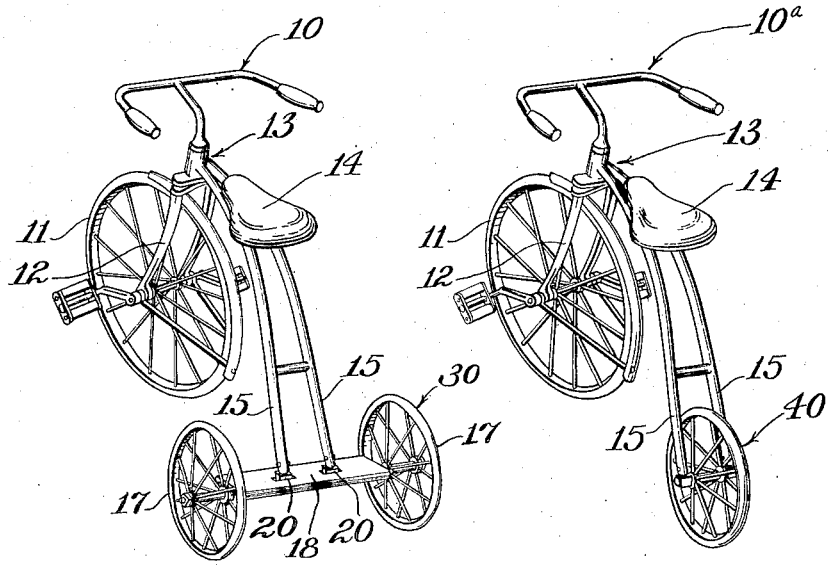
Figure 1 is a view in perspective of a tricycle constructed in accordance with the principles of my invention.
Figure 2 is a view in perspective of a bicycle showing the substitution of a single wheel at the rear for the two-wheeled unit shown in Figure 1.

When it is desired to convert the tricycle 10 into the bicycle 10—a shown in Figure 2, it is only necessary to remove the pins 23 from the alined passages in the posts 22 and the legs 15 whence the two-wheeled rear unit may be withdrawn from the tricycle 10. The one-wheeled rear unit 40 of the bicycle may be applied directly to the legs 15 of the yoke at the rear end of the frame 13.

The unit 40 includes an axle 41 upon which the wheel 42 revolves between spaced lugs 43 which are square-shaped in cross section and provided with transverse bores to receive the reduced opposite ends of the axle 41. A nut 44 is threaded on each end of the axle for retaining the lugs and wheel in position.

A post 45 projects upwardly from each lug and is circular in cross section so that said posts will have a neat fit within the lower ends of the hollow legs 15 of the yoke at the rear end of the saddle-supporting frame 13. A pin 46 is inserted through alined passages in each leg and the housed post for securing the posts and likewise the unit 40 to the frame 13 whereby the tricycle 10 shown in Figure 1 is converted into the bicycle 10—a illustrated in Figure 2.

It will be seen that the tricycle 10 may be converted readily into the bicycle 10—a by the removal of the rear unit 30 and by the application of the rear unit 40. This is accomplished by forcing the pins 23 from the alined passages in the posts 22 and associated legs 15 of the frame 13. When the posts 45 of the rear unit 40 have been seated in the lower ends of the hollow legs of the yoke at the rear end of the frame 13 and the pins 46 have been forced into the alined passages in the legs 15 and the housed posts 45, the converted vehicle is ready for operation.

The frames 13 together with the front wheels, yokes 12 and legs 15 are assembled into front units at the factory, and shipped to stores. Likewise, the rear wheel units 30 and 40 are also built at the factory and shipped to dealers so that it is possible for the dealers to supply their customers with either bicycles or tricycles by applying the proper unit to the frame 13, thus eliminating the necessity of having stocks of tricycles and bicycles on hand.

The posts 22 and the posts 45 not only have a neat fit within the lower ends of the legs 15 but they are sufficiently long to insure a safe and rigid connection between the units and the rear end of the frame 13.

A customer may desire both rear end units 30 and 40 so that he may convert the tricycle into a bicycle and vice versa. Furthermore, it will be possible for the owner of a tricycle at a later date to change the original purchase into a converted vehicle by buying the rear end unit 40.

Although a preferred and practical embodiment of the invention is disclosed herein, it is to be understood that various modifications may be made within the scope of the appended claims.

I claim:

1. In a vehicle having a saddle-supporting frame, a wheel rotatably mounted at the front end of said frame and a fork formed of tubular legs at the rear end thereof, an interchangeable rear wheel connection comprising an axle, a pair of spaced wheels rotatable on said axle, a pair of lugs, each lug having a projecting post received by a leg, a plate secured to the axle and having openings through which the lugs project, each leg and post being provided with transversely disposed and alined passages and a pin inserted through the alined passages in a post and associated leg for connecting the posts to the respective legs.

2. In a vehicle having a saddle-supporting frame, a wheel rotatably mounted at the front end of said frame and a fork formed of tubular legs at the rear end thereof, an interchangeable rear wheel connection comprising an axle, a pair of spaced wheels rotatable on said axle, a pair of lugs, each lug having a projecting post received by a leg, a plate secured to the axle and having openings through which the lugs project, each leg and post being provided with transversely disposed and alined passages and a pin inserted through the alined passages in a post and associated leg for connecting the posts to the respective legs, and spaced sleeves secured to the plate and receiving the axle to form bearings for said axle.

3. In a vehicle having a saddle-supporting frame, a wheel rotatably mounted at the front end of said frame and a fork formed of tubular legs at the rear end thereof, an interchangeable rear wheel connection comprising an axle, a pair of spaced wheels rotatable on said axle, a pair of lugs square-shaped in cross section, each lug having a projecting post received by a leg, a plate secured to the axle and having square-shaped openings through which the lugs project, each leg and post being provided with transversely disposed and alined passages and a pin inserted through the alined passages in a post and associated leg for connecting the posts to the respective legs.

CHARLES R. AHRENS.

REFERENCES CITED

The following references are of record in the file of this patent:

UNITED STATES PATENTS

| Number | Name | Date |
|---|---|---|
| 2,011,402 | Gallo | Aug. 13, 1935 |
| 2,212,741 | Johnson | Aug. 27, 1940 |